US012471744B2

(12) United States Patent
Bussell et al.

(10) Patent No.: US 12,471,744 B2
(45) Date of Patent: Nov. 18, 2025

(54) EXTENSIBLE SQUEEGEE WITH REVERSIBLE BLADE

(71) Applicant: Jeffrey A. Bussell, West Bloomfield, MI (US)

(72) Inventors: Jeffrey A. Bussell, West Bloomfield Township, MI (US); Tyrone Secord, Auburn Hills, MI (US)

(73) Assignee: Jeffrey A. Bussell, West Bloomfield, MI (US)

( * ) Notice: Subject to any disclaimer, the term of this patent is extended or adjusted under 35 U.S.C. 154(b) by 356 days.

(21) Appl. No.: 18/207,183

(22) Filed: Jun. 8, 2023

(65) Prior Publication Data

US 2024/0407612 A1 Dec. 12, 2024

(51) Int. Cl.

| | |
|---|---|
| ***A47L 1/06*** | (2006.01) |
| ***B25G 1/04*** | (2006.01) |
| ***B25G 3/38*** | (2006.01) |

(52) U.S. Cl.

CPC .................. *A47L 1/06* (2013.01); *B25G 1/04* (2013.01); *B25G 3/38* (2013.01)

(58) Field of Classification Search

CPC .. A47L 1/06; A47L 13/11; B25G 1/04; B25G 3/38

See application file for complete search history.

(56) References Cited

U.S. PATENT DOCUMENTS

| | | | |
|---|---|---|---|
| 6,931,690 | B2 | 8/2005 | Cox |
| 7,000,282 | B2 | 2/2006 | Cox et al. |
| 11,439,282 | B2 | 9/2022 | Bussell |
| 2006/0288508 | A1 | 12/2006 | Knopow et al. |
| 2009/0049636 | A1 | 2/2009 | Bae |
| 2011/0173768 | A1 | 7/2011 | Donato |
| 2020/0253433 | A1 | 8/2020 | Bussell |

FOREIGN PATENT DOCUMENTS

| | | | |
|---|---|---|---|
| CN | 217 827 679 | U | 11/2022 |
| EP | 2359728 | A2 | 8/2011 |

OTHER PUBLICATIONS

International Search Report for Appln. No. PCT/US2024/028835 mailed Oct. 4, 2024, 16 pages.

*Primary Examiner* — Shay Karls

(74) *Attorney, Agent, or Firm* — Dinsmore & Shohl LLP

(57) ABSTRACT

An adjustable hand-held squeegee device with reverse angle head adjustment. An elongated handle can include either a single elongated member or any plurality of members configured in telescoping fashion. A head includes a rotatable base portion supported at a forward end of the handle. A spring biased locking mechanism is integrated into the handle in proximity to the rotatable base and includes a forward projection engaging a first recess of the rotatable base in a first position. Upon retracting the mechanism via a projecting trigger portion, the rotatable base is rotated to align a second circumferentially offset recess so that, and upon releasing the trigger, the squeegee head is oriented in a reverse angular fashion relative to the handle.

7 Claims, 10 Drawing Sheets

EXTENSIBLE SQUEEGEE WITH REVERSIBLE BLADE

FIELD OF THE INVENTION

The present invention relates generally to squeegee or wiper style devices for various uses. More specifically, the present invention teaches a telescoping and reverse-angle adjustable squeegee for use by individuals, in particular when cleaning or wiping a lower surface and without the necessity of having to stoop or kneel.

BACKGROUND OF THE INVENTION

The prior art is documented with various types of squeegee or cleaning devices.

A first example is set forth in U.S. Pat. No. 11,439,282 to Bussell, which teaches an adjustable hand-held squeegee device with reverse angle head adjustment. An elongated handle can include either a single elongated member or any plurality of members configured in telescoping fashion. A head includes a rotatable base portion supported at a forward end of the handle. A spring biased locking mechanism is integrated into the handle in proximity to the rotatable base and includes a forward projection engaging a first recess of the rotatable base in a first position. Upon retracting the mechanism via a projecting trigger portion, the rotatable base is rotated to align a second circumferentially offset recess so that, and upon releasing the trigger, the squeegee head is oriented in a reverse angular fashion relative to the handle.

A further example of this is shown in Donato (US 2011/0173768) which discloses a squeegee having a handle with a resilient blade set at an angle less than ninety degrees of the angle formed between the handle and the point of the blade's attachment. This configuration allows the squeegee to work with gravity by preventing the newly cleaned surface from being fouled by used cleaning solution. As further disclosed, and when used with a tilt window, the squeegee pushes the cleaning solution down the tilted surface and with gravity to leave a clean dry surface.

Also noted is the swivel squeegee handle design of Bae US 2009/0049636. The wiper design of EP 2 359 728 to Moerman NV, teaches a floor squeegee which includes a body and a manually coupled rubber blade holder which is also linearly displaceable between positions along a longitudinal direction of the blade holder.

SUMMARY OF THE PRESENT INVENTION

The present invention discloses an adjustable hand-held squeegee device with reverse angle head adjustment. An elongated handle can include either a single elongated member or any plurality of members configured in telescoping fashion. A squeegee head includes a rotatable base portion supported at a forward end of the handle.

A spring loaded locking mechanism is integrated into the handle in proximity to the rotatable base and includes a forward projection engaging a first recess of the rotatable base in a first position. Upon retracting the locking mechanism via an integrally formed and projecting trigger portion, the rotatable base is rotated to align a second circumferentially offset recess so that, and upon releasing the trigger, the squeegee head is oriented in a reverse angular fashion relative to the handle.

Additional features include a width extending and flexible blade attached to the width extending and pivotally supported head assembly. The handle further comprising multiple inter-telescoping sections for adjusting between varying overall lengths. Other features include the head, neck and handle being constructed of durable material not limited to plastic or aluminum. Yet additional features include the ability to pivotally adjust the blade according to a non-limiting range of 110° to 180° between the first and second orienting positions.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached figures, the present invention teaches a telescoping and reverse-angle adjustable squeegee, generally at 100, for use by individuals, in particular when cleaning or wiping a lower surface of a window, glass shower enclosure, or the like, and without the individual having to stoop or kneel. Without limitation, this includes cleaning of a solution for a glass or other surface as well as wiping or clearing water buildup.

As will be further described in reference to the following illustrations, this is accomplished (according to the non-limiting and illustrated embodiment) by permitting the width extending head to be reverse angle adjusted, such as via a pivotal neck connection and in order to permit the user to exert a reverse direction (i.e. upward) motion to the device, this occurring such as in combination with extending the handle from the collapsed to extended positions.

Figure 1:
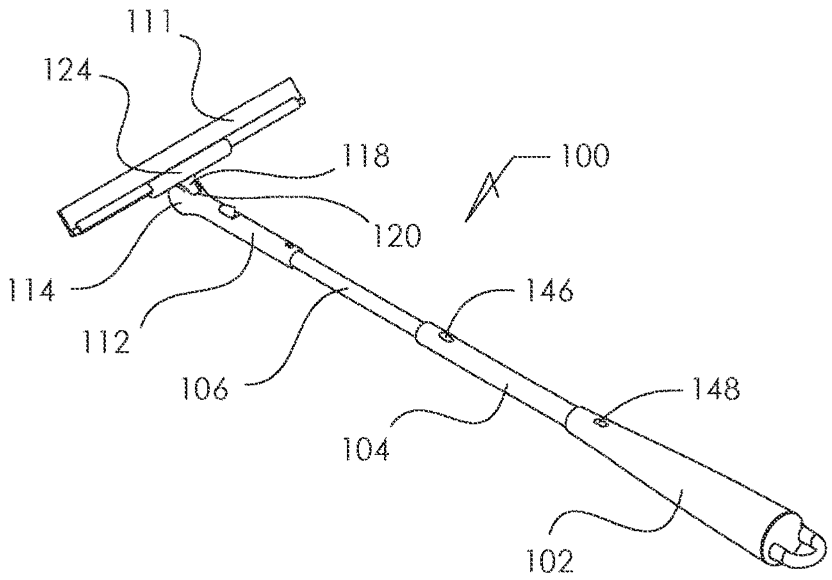
FIG. 1 presents an overall perspective view of a combination reversible squeegee blade and extensible handle according to a first embodiment of the present invention.
Figure 2:
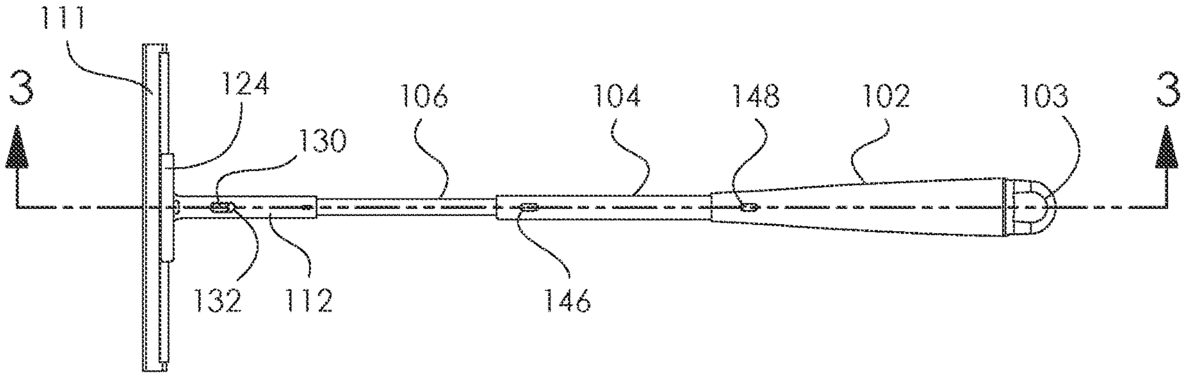
FIG. 2 is a plan view of the adjustable squeegee in the position of FIG. 1 and depicted in a telescopically extensible position.
Figure 3:
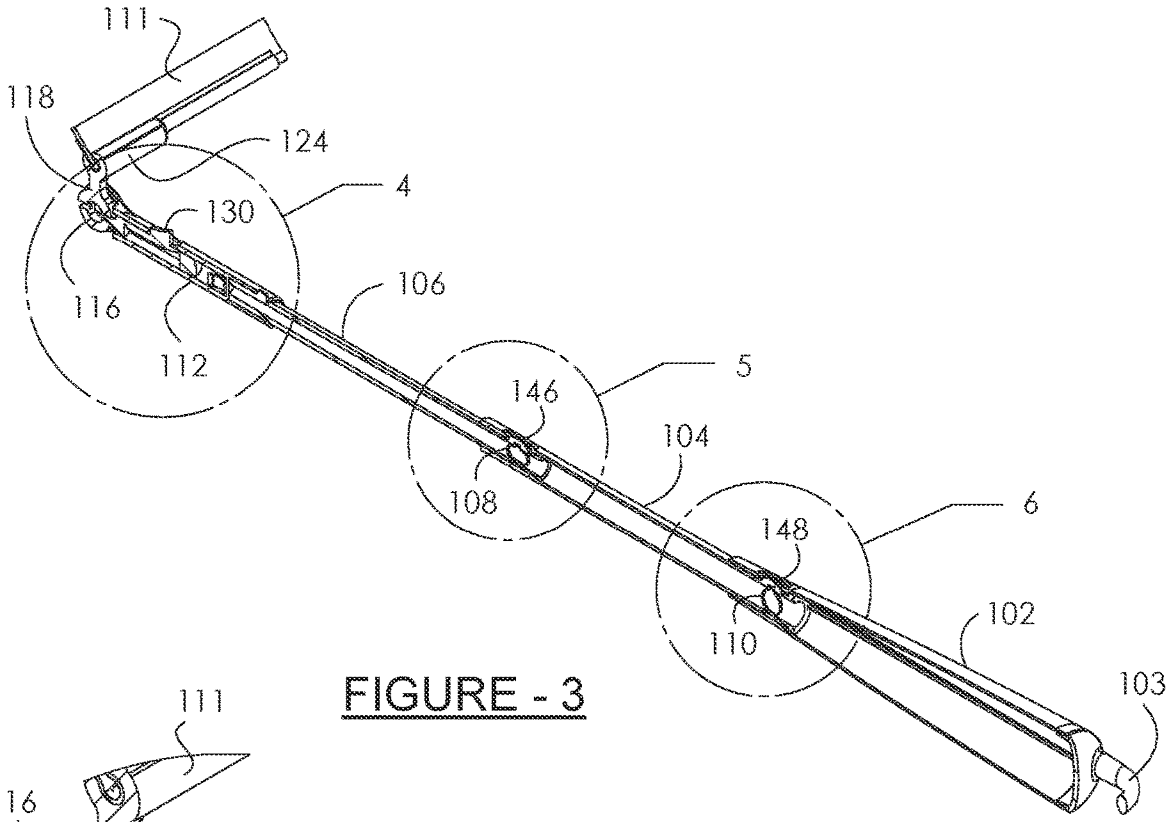
FIG. 3 is a cutaway view taken along line 3-3 of FIG. 2 and depicting the squeegee supporting head sub-assembly and telescoping handle.

FIG. 1 presents an overall perspective view of a combination reversible squeegee blade and extensible handle, depicted generally at 100, according to a first embodiment of the present invention. The squeegee can include a singular handle or, as shown, may incorporate any plurality of telescopic interconnected portions, these are shown in FIGS. 1-3 and includes a first base handle portion 102 (such further including a hook or loop shaped end 103 for suspending when not in use), and which supports second 104 and third 106 intermediate telescoping handle portions.

Without limitation, the handle portions 102, 104 and 106 are length inter-adjustable and subsequently lockable in any known fashion including providing twist to tighten and counter twist to loosen features incorporated into opposing circumferential surfaces established between the coaxially arranged and inner/outer diameter seating handle portions. Other length adjustment aspects can include, without limitation, substituting through the incorporation of spring loaded clips, see at 108 in FIGS. 3 and 5 and further at 110 in FIGS. 3 and 6 which, upon being depressed or triggered, permit the sections to relatively telescope in order to expand or retract.

Without limitation, the handle and other structural components of the device can be constructed of any of a lightweight metal such as an aluminum and/or can be constructed of a durable plastic or other suitable material. The outer handle portion can include any type of textured grip or cladding and each of the telescoping sections 102, 104 and 106 can be individually constructed by first and second split portions.

Figure 4:
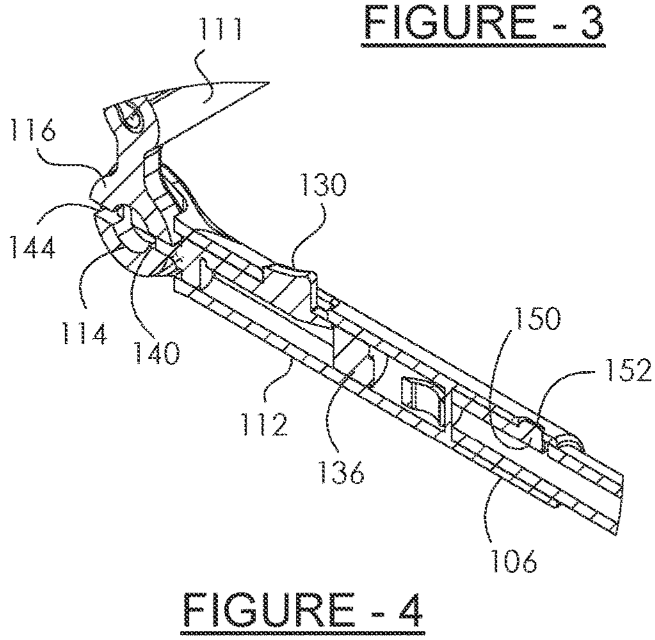
FIG. 4 is an enlarged partial view of area 4 represented in FIG. 3 of the squeegee supporting head sub-assembly with trigger mechanism for reversing the wiping blade between first and second pivotally adjusted positions.
Figure 7:
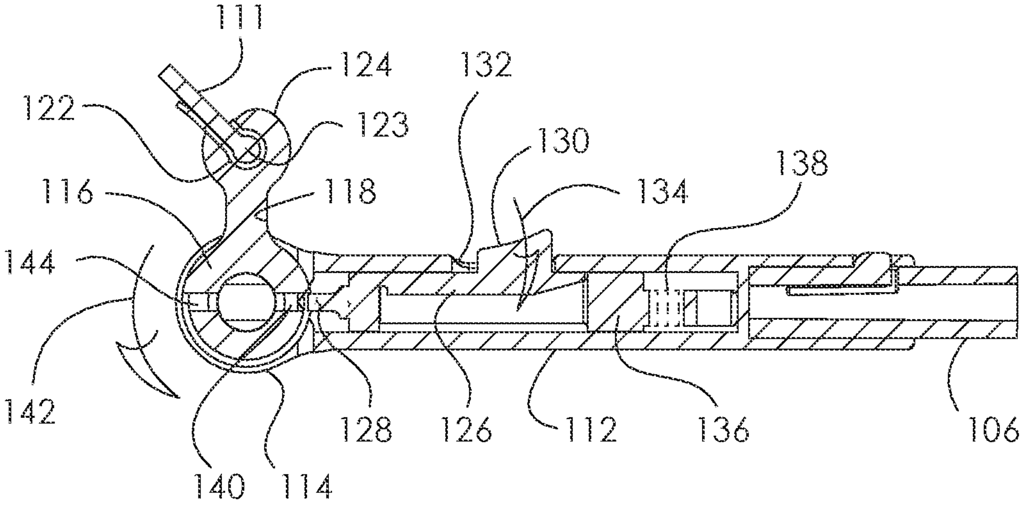
FIG. 7 presents a rotated plan view of the cutaway shown in FIG. 4 and better illustrating the spring loaded trigger mechanism for retracting a forward-most projection from a first seating recess in a rotatable base portion integrated into the squeegee neck and blade support portions.

As further shown, the interconnected tubular sections exhibit a generally narrowing (or tapering) from the base portion 102 through the intermediate 104 and end most 106 telescoping portions. A width extending squeegee blade, see as shown throughout at 111, is mounted to a forward subassembly including a sleeve shaped body 112 secured to an end of the outermost tubular handle section 106. As best depicted in FIGS. 4 and 7, the forward subassembly further includes a forward circular support 114 which is integrated into the sleeve shaped body 112.

A pivotally mounted head subassembly includes a rotary shaped base portion 116 which is rotationally supported either within or against the forward support 114. This includes as shown in FIG. 1 a stem shaped neck portion 118 extending from the rotary base portion 116 and which travels along a channel 120 configured in a circumferentially extending direction along the outer circular support 114.

As further shown, the squeegee blade 111 can include without limitation any suitable rubberized material of a given durometer or hardness, in addition to any silicone or other suitable water redirecting element. The blade 111 is typically supported within a rigid clip 122 (see as best shown in FIG. 7) which is in turn resistively engaged or otherwise installed within a recessed channel 123 which is configured within a mounting head 124 integrally extending in at least a partial width fashion from the stem shaped neck 118.

As further shown, the recess channel 123 can seat the reinforcing mounting clip or support 122 for the flex blade 111 to provide additional end backing support to the flex blade, when the same is bent during normal usage and to prevent the blade from over-bending to an excessive degree during use in order to extend its useful life.

As best shown in FIG. 7, the blade mounting subassembly further includes a retractable trigger mechanism incorporated in the sleeve shaped body 112 having a spring body including a beam shaped upper portion 126 and including a forward projection 128. A trigger portion 130 is integrated into the beam shaped upper portion 126 such that the trigger portion projects upwardly through a channel 132 configured along the upper edge of the sleeve shaped body 112.

In operation, the trigger portion 130 is downwardly deflected (see as referenced by directional arrow 134) such that, and upon the upper beam portion 126 being deflected downwardly so that the trigger portion is fully retracted into the axial extending interior of the sleeve shaped body 112, the trigger mechanism is retracted rearwardly against an inner displaceable spacer portion 136. A coil spring 138 biases the spacer portion 136 and trigger mechanism forwardly so that its forward projection 128 seats within a first recessed location 140 configured into the rotary shaped base portion 116. Upon retracting the trigger mechanism, the blade supporting head subassembly is rotated (such as at a 180 degree angle as referenced by directional arrow 142) so that a second recessed location 144 is aligned with the forward projection 128 and, upon releasing the trigger mechanism, re-seats and affixes the head assembly in the rotationally offset configuration. Without limitation, the angle of pivotal adjustment of the squeegee blade can also be provided, without limitation, according to a range of 110° to 180° between the first and second orienting positions.

Figure 5:
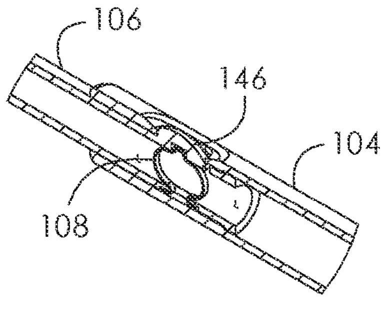
FIG. 5 is an enlarged partial view of area 5 represented in FIG. 3 and illustrating a selected interface between first and second telescoping tubular shaped handle portions with an interior supported and spring biased clip which, upon depressing, for collapsing the handle.
Figure 6:
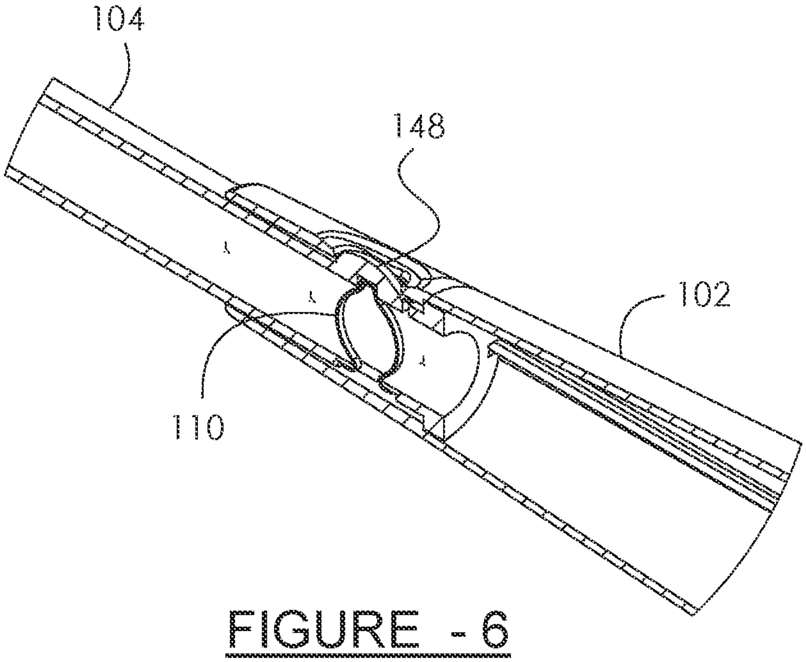
FIG. 6 is an enlarged partial view of area 6 represented in FIG. 3 and illustrating a further selected interface between second and third telescoping tubular shaped handle portions similar to that shown in FIG. 5.

FIG. 2 is a plan view of the adjustable squeegee in the position of FIG. 1 in which the telescopic handle portions 102, 104 and 106 are depicted in a telescopically extensible position. Additional depressible trigger portions 146 and 148 are provided corresponding to the spring clips 108 and 110 (see also FIGS. 5 and 6). The trigger portions 146/148 operate in similar fashion to the trigger mechanism 126/130 of FIG. 7 to reconfigure the telescoping handles between the collapsed and extended positions. As shown in FIGS. 5 and 6, the trigger portions operate in similar fashion to that depicted in FIG. 7 for the forward squeegee blade supporting subassembly and, upon being inwardly depressed, allow for relative axial translation between the telescoping handle portions.

FIG. 3 presents a cutaway view taken along line 3-3 of FIG. 2 and depicting the squeegee supporting head subassembly and telescoping handle, with FIG. 4 providing an enlarged partial view of area 4 represented in FIG. 3 of the squeegee supporting head sub-assembly with trigger mechanism for reversing the wiping blade 111 between first and second pivotally adjusted positions. As shown in FIG. 4, the forward most handle portion 106 includes an outwardly biased protrusion 150 which engages within an aligning inner facing recess 152 in the handle portion 106 for affixing the forward blade mounting subassembly to the handle.

As previously described, FIG. 5 is an enlarged partial view of area 5 represented in FIG. 3 and illustrating a selected interface between first 104 and second 106 intermediate telescoping tubular shaped handle portions, with an interior supported and spring biased clip 108 which, upon depressing, for collapsing the handle.

FIG. 6 is an enlarged partial view of area 6 represented in FIG. 3 and illustrating a further selected interface between second 104 and third 102 telescoping tubular shaped handle portions similar to that shown in FIG. 5. FIG. 7 again presents a rotated plan view of the cutaway shown in FIG. 4 and better illustrating the spring loaded trigger mechanism for retracting a forward-most projection 128 from a first seating recess in a rotatable base portion 116 integrated into the squeegee neck and blade support portions.

Figure 8:
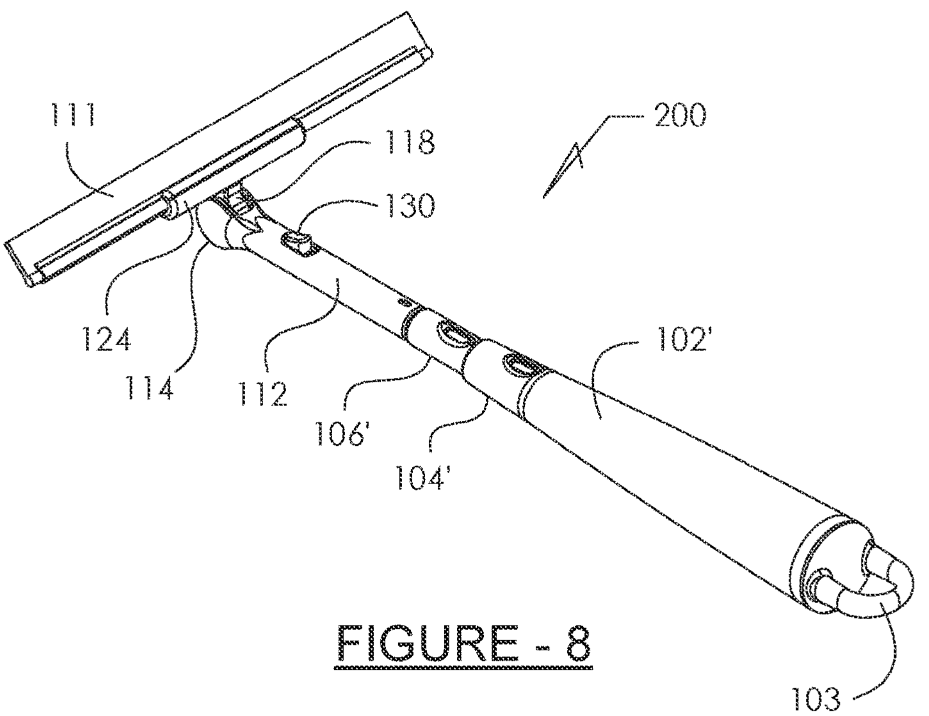
FIG. 8 presents an overall perspective view of a combination reversible squeegee blade and extensible handle according to a second embodiment of the present invention.

Proceeding to FIG. 8, presented is an overall perspective view of a combination reversible squeegee blade and extensible handle according to a second embodiment 200 of the present invention which includes substantially the same forward support structure 112 for retaining and reconfiguring the widthwise extending blade 111. The individual telescoping portions of the handle assembly are reconfigured according to this variant as shown at 102'/104'/106' and operate in similar fashion to that previously described in FIGS. 1-6.

Figure 9:
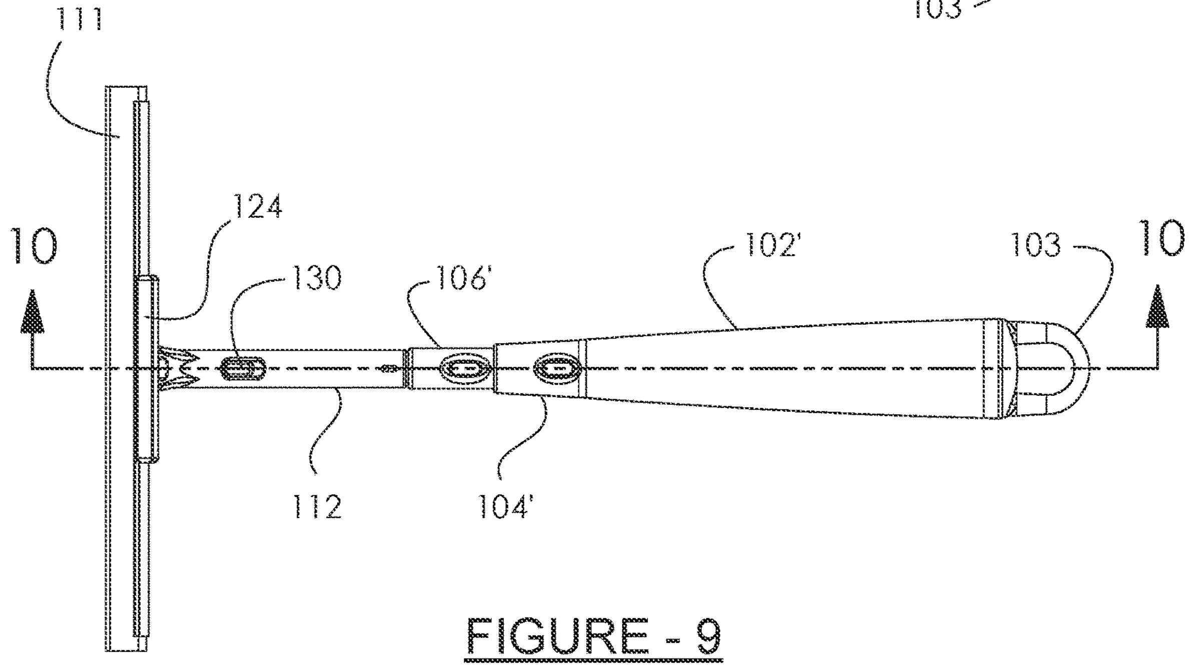
FIG. 9 is a plan view of the adjustable squeegee in the position of FIG. 8 and depicted in a telescopically collapsed position.
Figure 10:
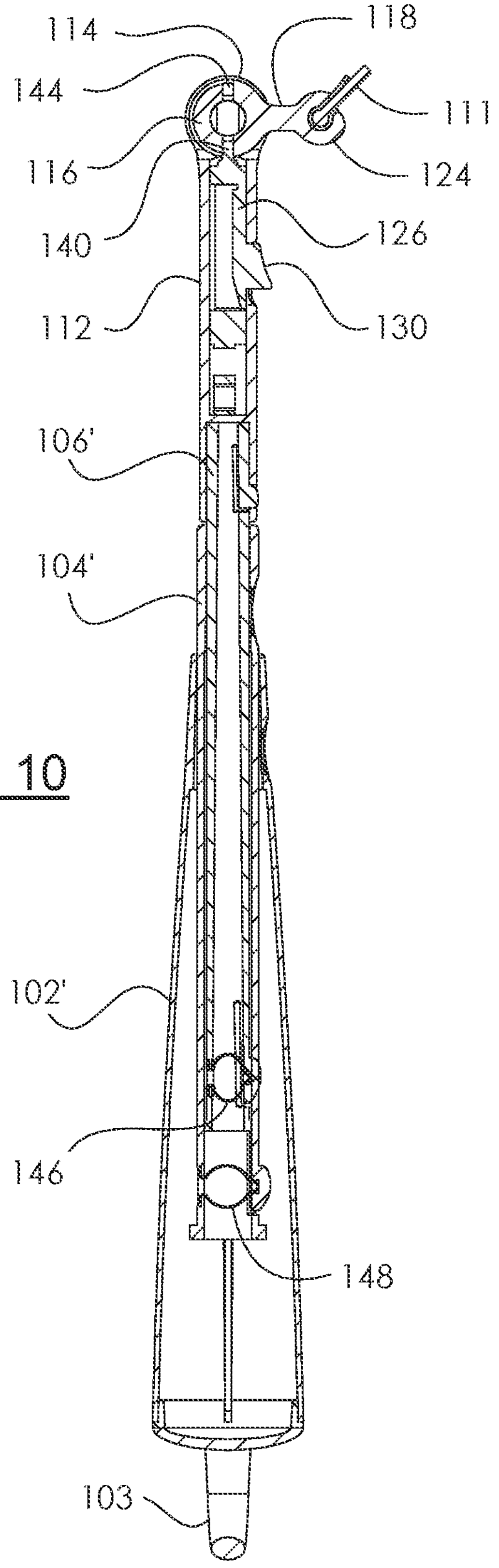
FIG. 10 is a cutaway view taken along line 10-10 of FIG. 9 and depicting the squeegee supporting head sub-assembly and telescoping handle.

FIG. 9 is a plan view of the adjustable squeegee in the position of FIG. 8 and depicted in a telescopically collapsed position, with FIG. 10 providing a cutaway view taken along line 10-10 of FIG. 9 and depicting the squeegee supporting head sub-assembly and telescoping handle in the position of FIG. 9.

Figure 11:
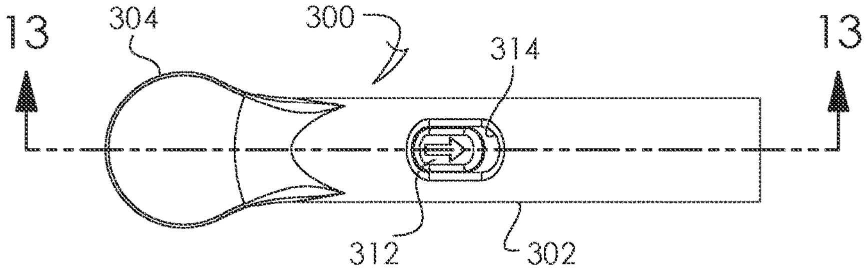
FIG. 11 is a plan view of the supporting head sub-assembly according to the further embodiment for attaching the squeegee blade and integrated rotatable base portion.

Proceeding to FIG. 11, a plan view is shown of a supporting head sub-assembly 300 according to the further embodiment for attaching the squeegee blade 111 and integrated rotatable base portion 116 depicted in FIG. 1 et seq. As will be described in reference to each of succeeding subset groupings of FIGS. 11-14, FIGS. 15-17, FIGS. 18-20 and FIGS. 21-25, alternately reconfigured forward mounting subassemblies are depicted respectively at 300 (FIGS. 11-14), 400 (FIGS. 15-17), 500 (FIGS. 18-20) and 600 (FIGS. 21-25). In each instance, the telescoping handle assembly and forward end mounted squeegee blade 111, mounting clip 122 and head assembly rotary support 116 are utilized from the preceding described embodiment, with it further being understood that alternately configured handle and squeegee blade and mount structures can be substituted for those shown.

Referencing again the subset variant 300 of FIGS. 11-14, the forward mounting subassembly includes a similar sleeve shaped body (also an outer handle housing) 302 which terminates at a forward end in a pair of spaced apart paddle shaped portions 304 and 306 which rotationally support therebetween the rotary shaped base portion 116. A suitable crosswise extending mounting pin or other rotationally seating capture structure (not shown) can be employed for securing the squeegee blade head mounting assembly (again including the rotary shaped base portion 116) between.

A slide lock pin component 308 is incorporated into the forward mounting subassembly such that a forward most projection 310 seats within a selected recessed location 140 or 144 of the squeegee head rotary support. A trigger portion 312 is located within an axial directed slot 314 in the outer handle housing 302 and, as best shown in the cutaway view of FIG. 13, includes a recess notch 316 in an underside of a base support plate 318. An opposing upper shoulder 320 associated with the slide lock pin component 308 seats against the underside recess notch 316 such that rearward directed sliding motion exerted against the trigger 312 causes slaved rearward retraction of the slide lock pin component 308 and forward most projection 310.

Figure 12:
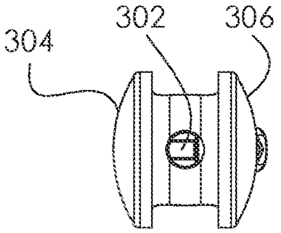
FIG. 12 is a rotated end view of the supporting head sub-assembly of FIG. 11.
Figure 13:
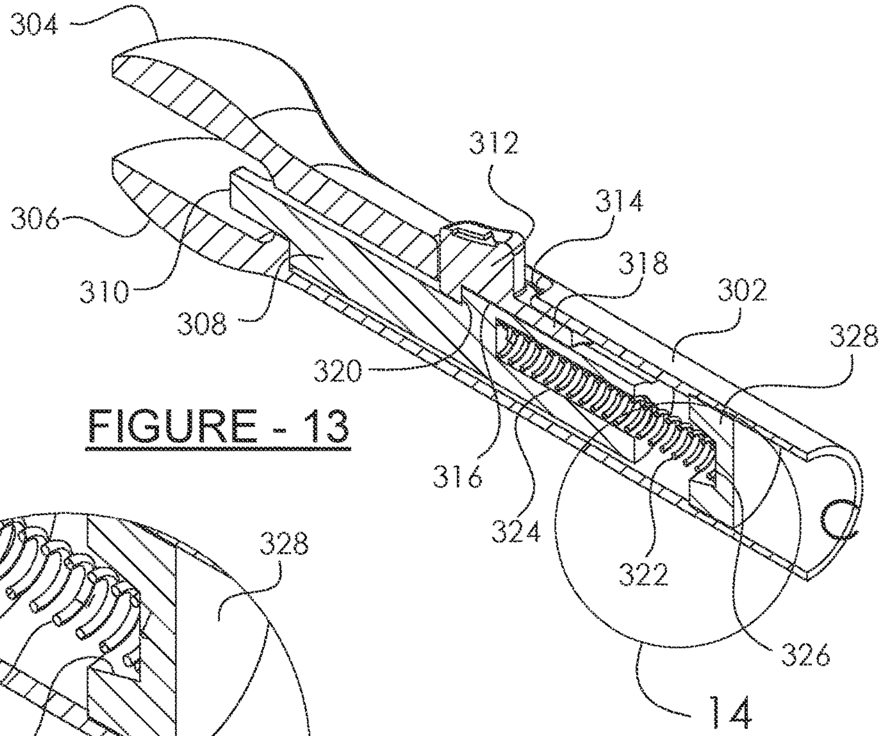
FIG. 13 is a cutaway view taken along line 13-13 of FIG. 11 and better depicting the spring loaded trigger mechanism for retracting a forward-most projection from a first seating recess in the rotatable base portion integrated into the squeegee neck and blade support portions.

FIG. 12 is a rotated end view of the supporting head sub-assembly of FIG. 11, with FIG. 13 providing a cutaway view taken along line 13-13 of FIG. 11 and better depicting the spring loaded trigger mechanism for retracting a forward-most projection 310 from a first seating recess (again previously shown at 140) in the rotatable base portion integrated into the squeegee neck and blade support portions. Additional features include a coil spring 322 which is seated within a recessed channel 324 extending within the rear end of the slide lock pin component 308 at a forward and within an opposing recessed cup profile 326 of a spring retainer 328 mounted within the annular interior of the handle housing at a rear end.

Figure 14:
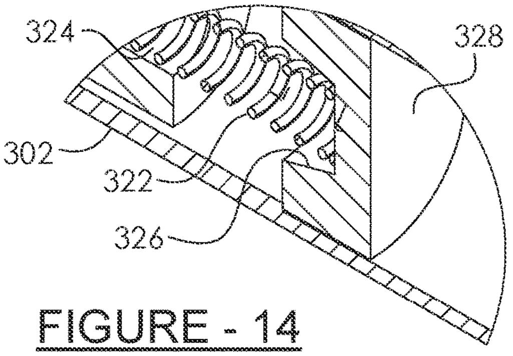
FIG. 14 is a further partial view of area 14 of FIG. 13 and depicting the internal base support for receiving the coil spring in order to forwardly bias the inner trigger component for seating the recess in the rotatable integrated base portion associated with the squeegee head and neck sub-assembly.

FIG. 14 provides a further partial view of area 14 of FIG. 13 and depicting the internal base support feature of the spring retainer 328 for receiving the coil spring 322 in order to forwardly bias the inner trigger actuating slide lock component pin component 308 and upper shoulder supported trigger 312 for seating the recess in the rotatable integrated base portion associated with the squeegee head and neck sub-assembly.

Figure 16:
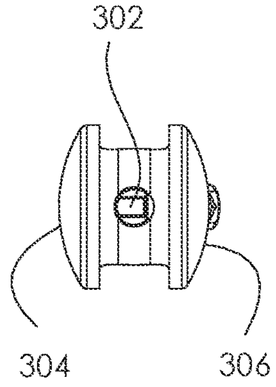
FIG. 16 is a rotated end view of the supporting head sub-assembly of FIG. 15.
Figure 15:
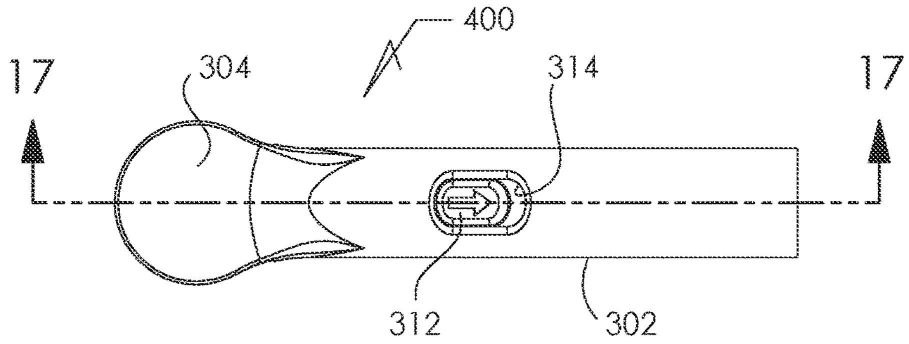
FIG. 15 is a plan view of a supporting head sub-assembly according to an alternate embodiment as compared to FIG. 11 for attaching the squeegee blade and integrated rotatable base portion.
Figure 17:
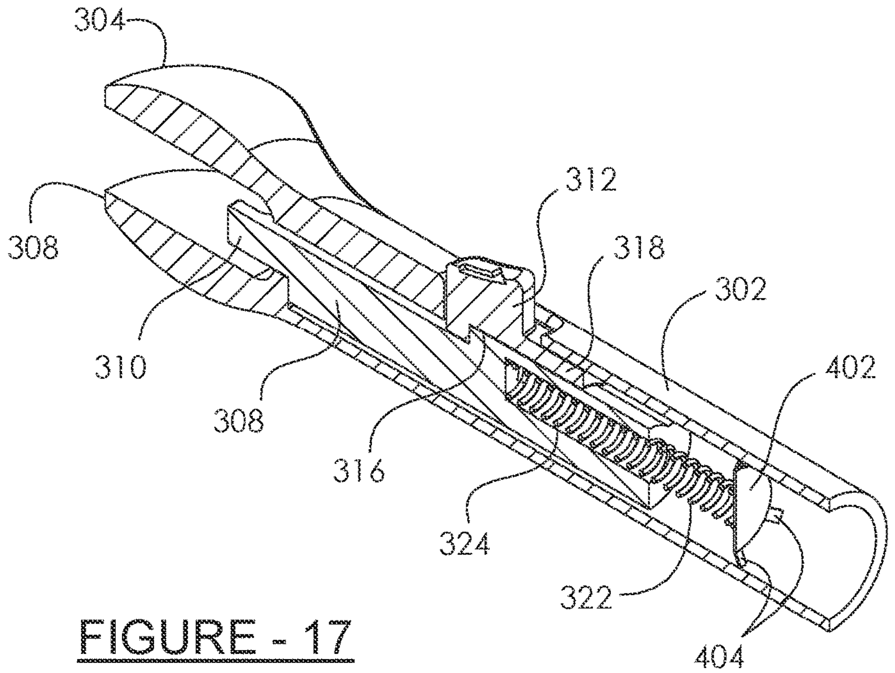
FIG. 17 is a cutaway view taken along line 17-17 of FIG. 15 and better depicting the subset variant of the spring loaded trigger mechanism for retracting a forward-most projection from a first seating recess in the rotatable base portion integrated into the squeegee neck and blade support portions, again according to the subset variant of FIG. 11.

Proceeding to FIG. 15 and succeeding FIGS. 16-17, a series of plan, rotated end and cutaway views are shown of a supporting head sub-assembly according to a first alternate embodiment 400, as compared to as previously described in FIG. 11, for attaching the squeegee blade and integrated rotatable base portion. The variant 400 is largely similar to that shown in FIG. 13 for the corresponding variant 300, with identical features being repetitively numbered. The recessed cup profile 326 with spring retainer 328 is further substituted by a reconfigured spring retainer 402 with locking fingers or teeth (further at 404) for securing the retainer 402 into position against the inner annular wall of the outer handle housing 302.

FIG. 16 is a rotated end view of the supporting head sub-assembly of FIG. 15, with FIG. 17 again further providing a cutaway view taken along line 17-17 of FIG. 15 and better depicting the subset variant of the spring loaded trigger mechanism 308 for retracting the forward-most projection 310 from the first seating recess 140 in the rotatable base portion 116 integrated into the squeegee neck and blade support portions, again according to the subset variant of FIG. 11.

Figure 19:
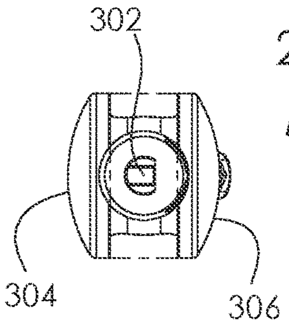
FIG. 19 is a rotated end view of the supporting head sub-assembly of FIG. 18.
Figure 18:
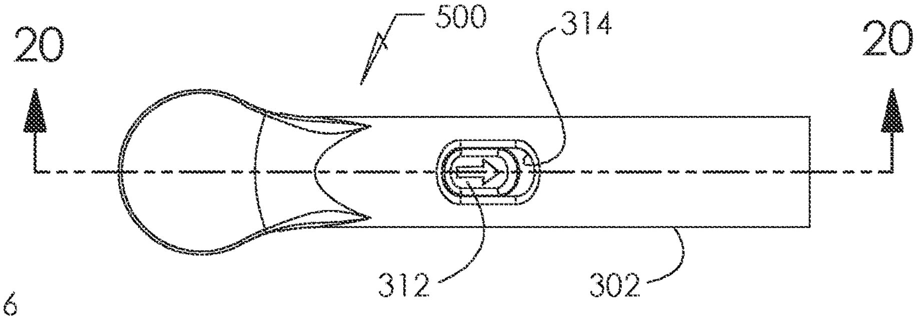
FIG. 18 is a plan view of a squeegee blade supporting head sub-assembly according to an alternate embodiment as compared to FIGS. 11 and 15 for attaching the squeegee blade and integrated rotatable base portion.

Proceeding to the plan and rotated end views of FIGS. 18-19, a squeegee blade supporting head sub-assembly according to a further alternate embodiment, see at 500, is provided as compared to FIGS. 11 and 15 for attaching the squeegee blade and integrated rotatable base portion.

As with prior variants 300 and 400, identical elements are repetitively numbered. As best shown in the cutaway view of FIG. 20, this taken along line 20-20 of FIG. 18, better depicted is a further subset variant of the spring loaded trigger mechanism is shown at 308' for retracting the forward-most projection 310 from the first seating recess in the rotatable base portion integrated into the squeegee neck and blade support portions.

Figure 20:
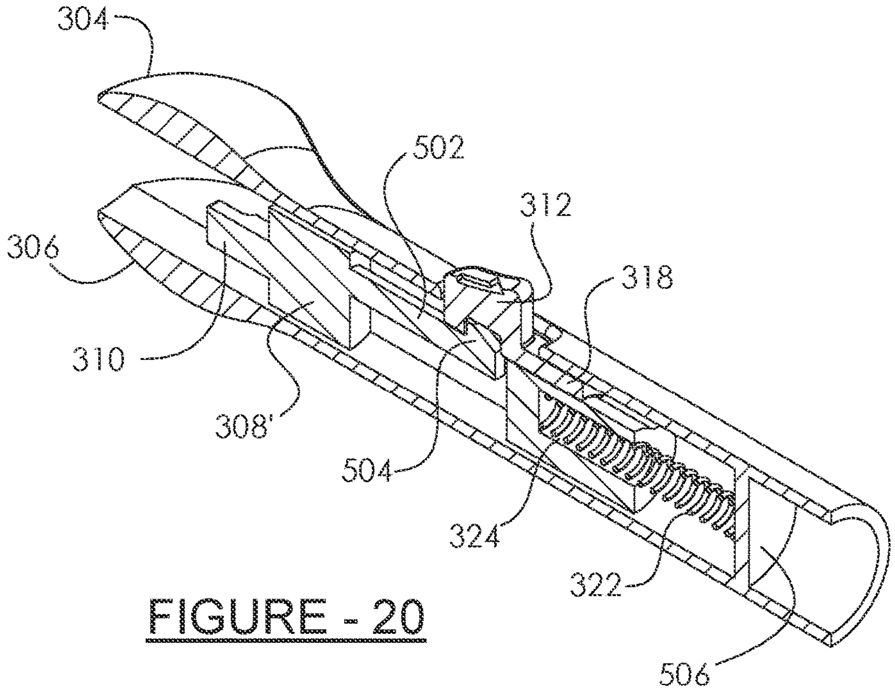
FIG. 20 is a cutaway view taken along line 20-20 of FIG. 18 and better depicting the further subset variant of the spring loaded trigger mechanism for retracting a forward-most projection from a first seating recess in the rotatable base portion integrated into the squeegee neck and blade support portions, again according to the subset variant of FIG. 18.

The redesigned trigger mechanism 308' includes a narrowed extending beam portion 520, which terminates in an underside projecting locking finger 504 which interlocks with the upper trigger/release button 312 and associated slide lock pin component. A further redesigned spring retainer 506 is shown in FIG. 20 which is integrated into the interior body of the trigger mechanism and seats a rear end of the spring 322 for biasing the trigger mechanism 308' and projection 310 in a forward seating direction.

Figure 22:
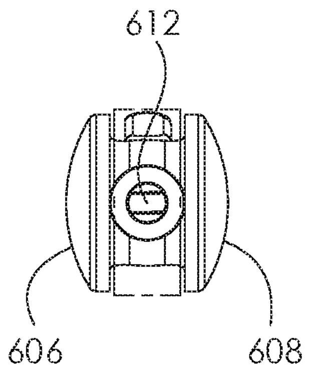
FIG. 22 is a rotated end view of the supporting head sub-assembly of FIG. 21.
Figure 21:
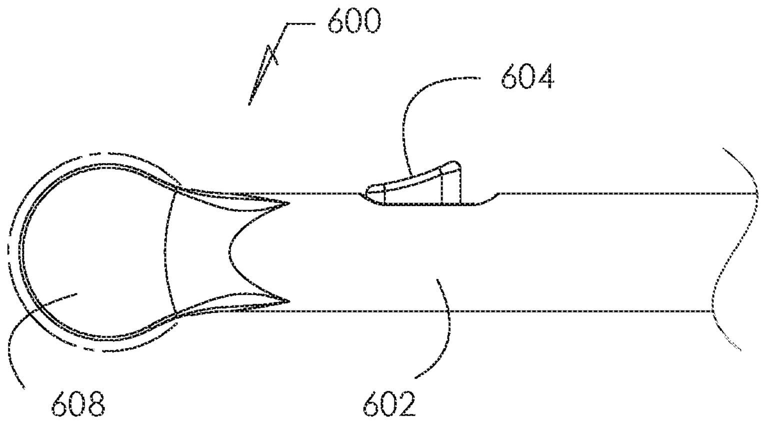
FIG. 21 is a plan view of a squeegee blade supporting subassembly according to a still further alternate embodiment for attaching the squeegee blade and integrated base portion.
Figure 23:
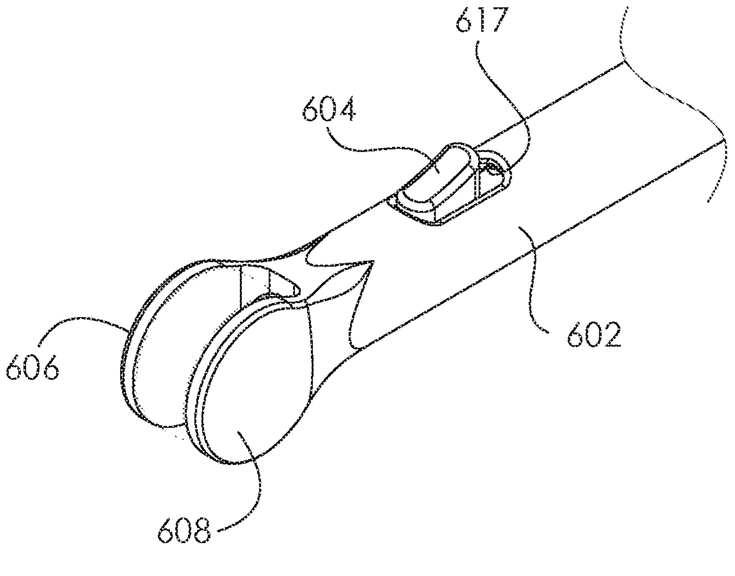
FIG. 23 is a perspective view of head assembly of FIG. 21.
Figure 24:
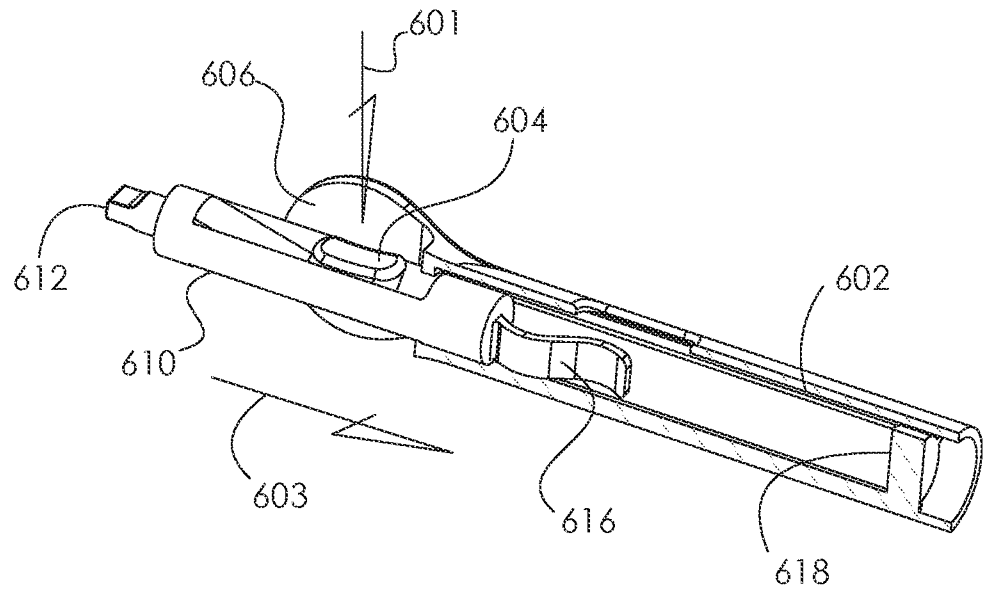
FIG. 24 presents a cutaway and pre-assembly view of the spring loaded trigger mechanism according to the variant of FIG. 21.
Figure 25:
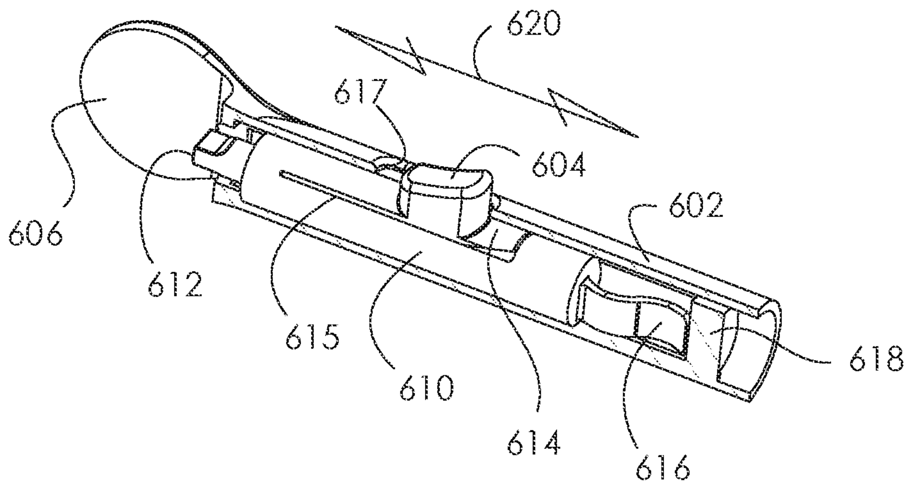
FIG. 25 presents a succeeding assembly cutaway view of the head assembly and spring loaded retractable trigger mechanism of FIG. 24.

Proceeding to FIG. 21 is a plan view is shown at 600 of a squeegee blade supporting subassembly according to a still further alternate embodiment for attaching the squeegee blade and integrated base portion and which includes a main sleeve shaped body 602 with an upper trigger 604. The sleeve shaped body terminates in a pair of forward spaced apart rotary seating ears or pads 606/608. FIG. 22 is a rotated end view of the supporting head sub-assembly of FIG. 21 and FIG. 23 presents a perspective view of head assembly of FIG. 21;

FIG. 24 presents a cutaway and pre-assembly view of the spring loaded trigger mechanism 610 according to the variant of FIG. 21, which includes a forward most seating projection 612. The trigger 604 is further depicted which is integrated into an axially deflecting beam portion 614 (see as shown in FIG. 25 which presents a succeeding assembly cutaway view of the head assembly and spring loaded retractable trigger mechanism of FIG. 24). The beam portion 614 is in turn configured by a lengthwise extending slot 615 such that the supported trigger 604 can be deflected in a vertical direction (see as further shown at 601 in FIG. 24) concurrently with being axially installed within the forward open end of the main sleeve shaped body 602 (see further directional arrow 603).

Upon being rearwardly installed, the trigger 604 seats within an upper aligning recess channel 617 in the main body 602 so that its spring beam supported construction causes it to be upwardly deflected into the seating arrangement of FIG. 25. At this point, a curved leaf-type spring 616 (such having a general reverse bended shape) extends rearwardly from the trigger mechanism 610 into contact with an integrated interior spring retainer 618 in order to forwardly bias the trigger mechanism in a forward direction for seating within either of the first 140 or second 144 seating recesses in the rotatable support head 116 of the squeegee head support, with bi-directional translation of the trigger mechanism within the main body (see as shown at 620 in FIG. 25) resulting in either of rearward disengagement of forward re-engagement of the forward most trigger projection 612 to the squeegee rotatable head support 116.

Without limitation, the rotational adjustment mechanism described can be substituted by other structure in order to pivotally readjust the head and blade to any angled desired. It is also envisioned that other articulating and/or universally adjusting structure can be integrated to achieving any desired blade orientation in support of the proposition of being able to first exert a downward stroke of a squeegee head and blade in a first orientation, following which the blade angle is adjusted to a second orientation prior to a executing a second reverse directed upward stroke, all while the user can remain in a standing (non-keeling or stopping) position.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings are have been described in detail, various alternative designs and embodiments exist for practicing the disclosure defined in the appended claims.

We claim:

1. An adjustable hand-held squeegee device with reverse angle adjustment, comprising:

an elongated handle;

a forward subassembly including a sleeve shaped body secured to said handle, said sleeve shaped body including a pair of spaced apart paddle shaped portions;

a head subassembly having a rotary shaped base portion rotationally supported between said paddle shaped portions and in turn supporting an elongated and widthwise attachable squeegee blade;

said head subassembly having a neck extending from said rotary base portion and which travels in a circumferentially extending direction along said forward most portion of said forward subassembly;

a trigger mechanism integrated into said forward subassembly and including a trigger portion projecting upwardly from a base support plate through an axial directed slot in said housing, a slide lock pin component engaging a recess notch in said base support plate, said slide lock pin component having a forward biased projection engaging a first circumferentially positioned recess of said rotary base portion of said head subassembly to establish a first orienting position of said head; and a coil spring seated within a recessed channel extending within said slide lock component at a forward end, said spring extending rearwardly to an opposing recessed cup profile mounted within an annular interior of said handle for forwardly biasing said trigger mechanism such that, and upon retracting said locking mechanism via said projection, said rotary shaped base portion being rotated to align with a second circumferentially offset recess so that, and upon releasing the trigger, said head subassembly is oriented in a second and reverse angular position relative to the handle.

2. The device as described in claim 1, said handle further comprising plurality of telescopic interconnected portions for adjusting between varying overall lengths.

3. The device as described in claim 1, at least one of said handle, forward subassembly and head subassembly being constructed of durable material not limited to a plastic or aluminum.

4. The device as described in claim 1, further comprising an angle of pivotal adjustment of the squeegee blade according to a range of 110° to 180° between said first and second orienting positions.

5. The device as described in claim 1, said pivotally mounted head subassembly further comprising a recessed channel within which is supported the squeegee blade via a rigid supporting clip extending in at least a partial width fashion from said neck.

6. The device as described in claim 5, said elongated blade further comprising an enlarged base slidably disposed in a laterally installing fashion within an open end location of said recessed channel.

7. An adjustable hand-held squeegee device with reverse angle adjustment, comprising:

an elongated handle;

a forward subassembly including a sleeve shaped body secured to said handle, said sleeve shaped body including a pair of spaced apart paddle shaped portions;

a head subassembly having a rotary shaped base portion rotationally supported between said paddle shaped portions and having a recessed channel within which an elongated squeegee blade is attachable in a widthwise direction, a neck extending from said rotary base portion;

a trigger mechanism incorporated into said forward subassembly and including a trigger portion projecting upwardly from a base support plate through an axial directed slot in said housing, a slide lock pin component engaging a recess notch in said base support plate, said slid lock pin component having a forward biased projection engaging a first circumferentially positioned recess of said rotary base portion of said head subassembly to establish a first orienting position of said head; and a compression spring seated within a second recessed channel extending within said slide lock component at a forward end and extending rearwardly to an opposing recessed cup profile mounted within an annular interior of said handle for forwardly biasing said trigger mechanism such that, and upon retracting said locking mechanism via said projection, said rotary shaped base portion being rotated to align with a second circumferentially offset recess so that, and upon releasing the trigger, said head subassembly is oriented in a second and reverse angular position relative to the handle.

* * * * *